No. 847,731. PATENTED MAR. 19, 1907.
J. B. CONGER.
COOKING AND WASHING APPARATUS.
APPLICATION FILED AUG. 1, 1905.
3 SHEETS—SHEET 1.
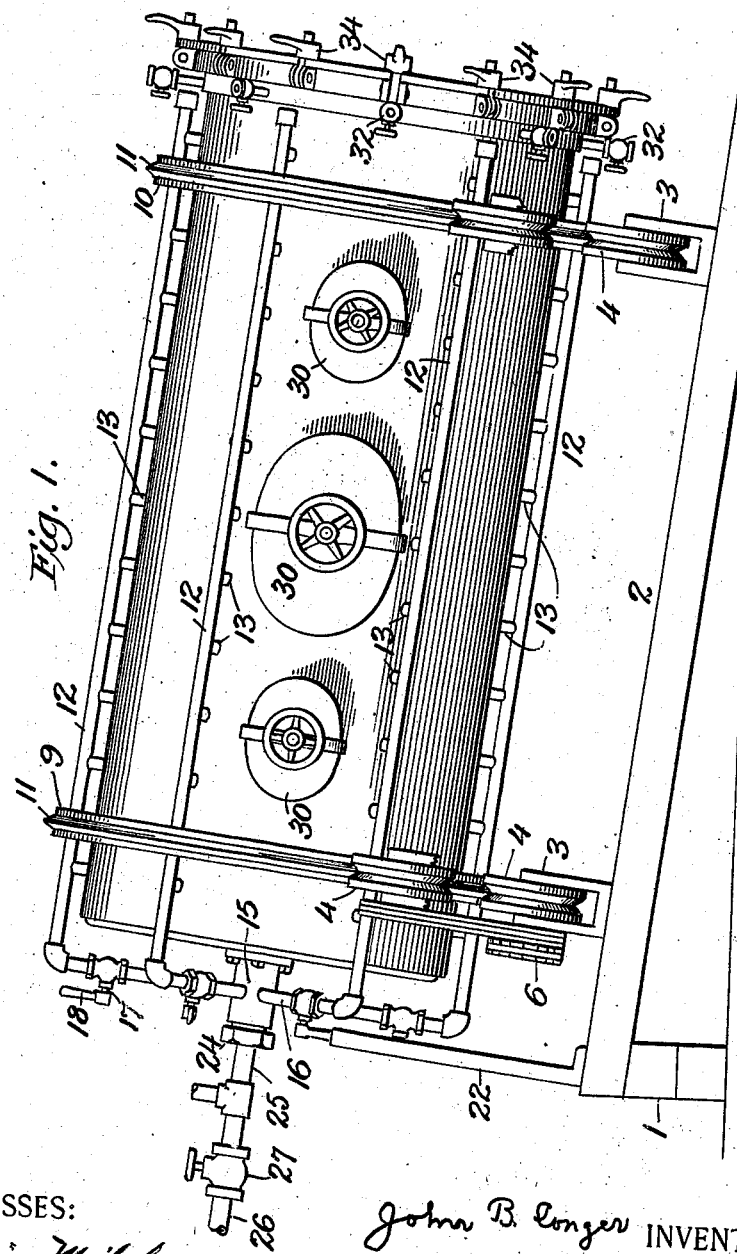

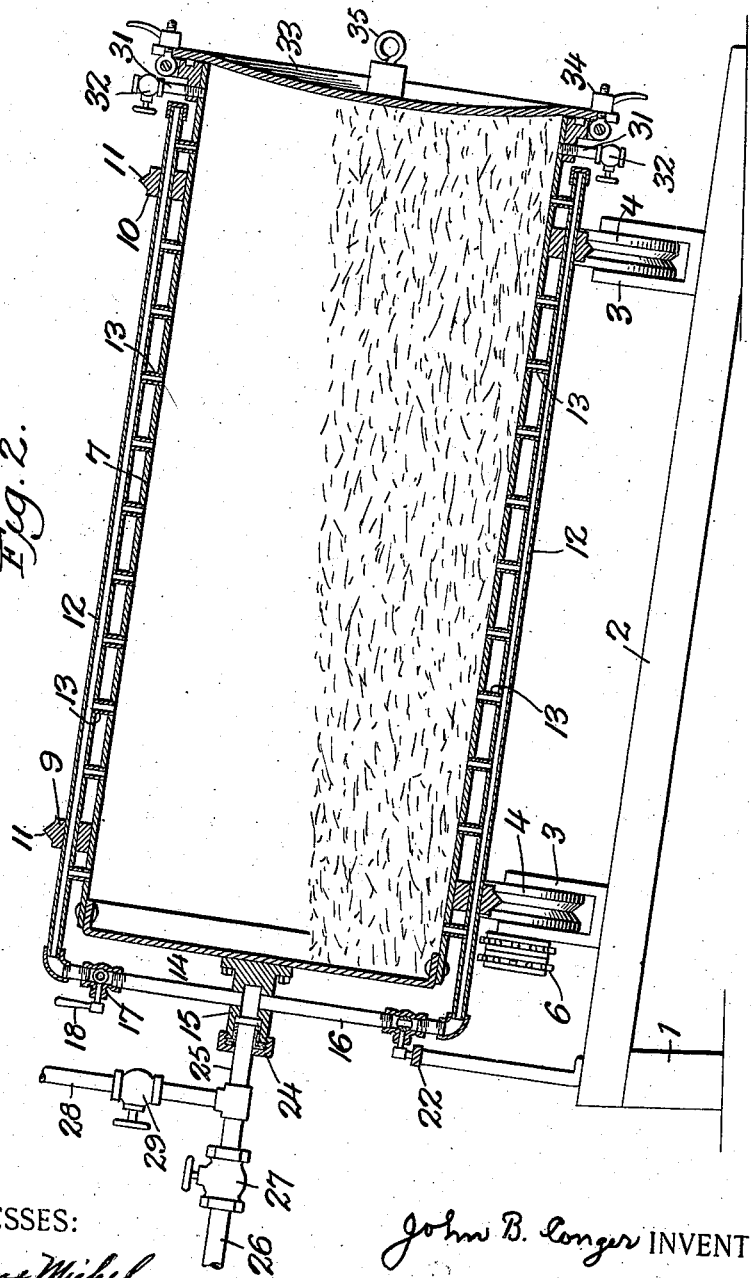

No. 847,731. PATENTED MAR. 19, 1907.
J. B. CONGER.
COOKING AND WASHING APPARATUS.
APPLICATION FILED AUG. 1, 1905.
3 SHEETS—SHEET 3.
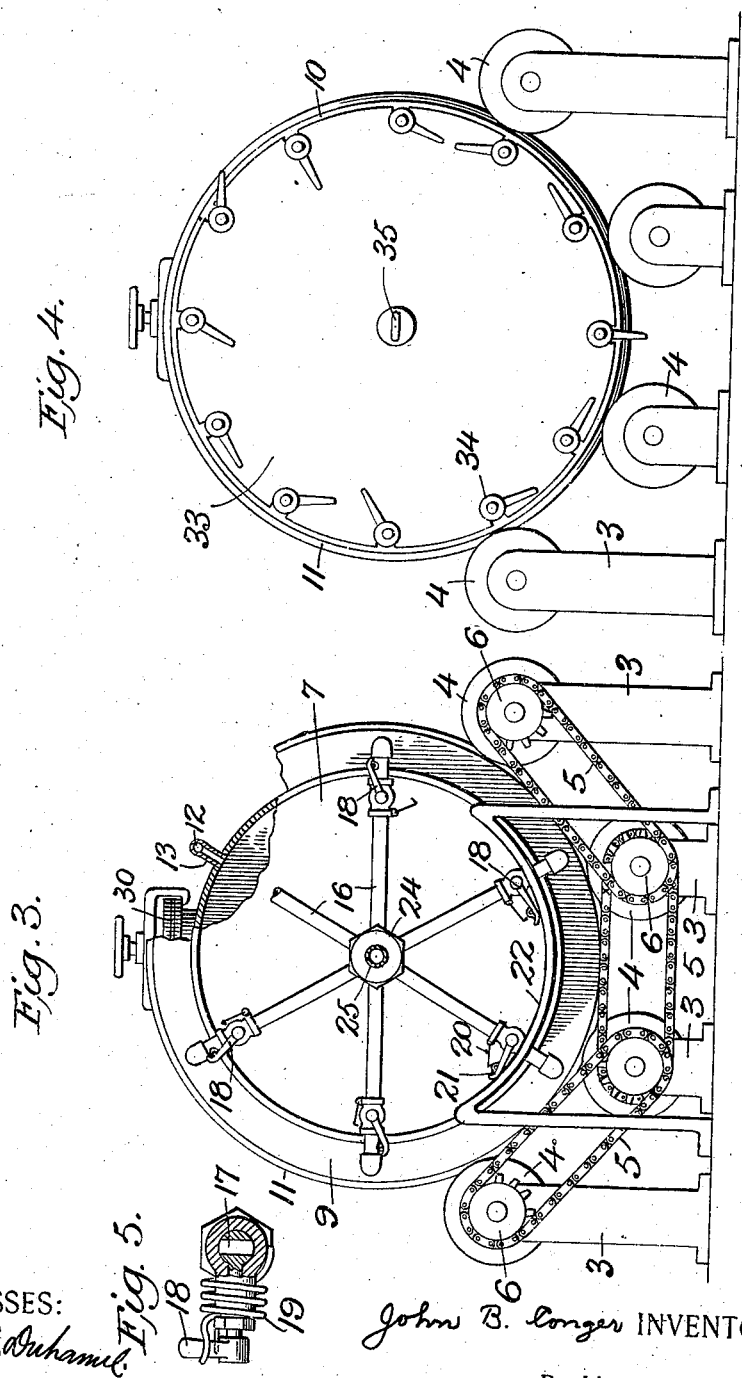
WITNESSES:
James T. Duhamel.
Madeleine Michel.
John B. Conger INVENTOR:
By his Attorney
W. H. Clarke

UNITED STATES PATENT OFFICE.

JOHN B. CONGER, OF NEW YORK, N. Y., ASSIGNOR, BY MESNE ASSIGNMENTS, TO THE STRAW PULP AND PAPER COMPANY, OF NEW YORK, N. Y., A CORPORATION OF MAINE.

COOKING AND WASHING APPARATUS.

No. 847,731.     Specification of Letters Patent.     Patented March 19, 1907.

Application filed August 1, 1905. Serial No. 272,159.

*To all whom it may concern:*

Be it known that I, JOHN B. CONGER, a citizen of the United States, residing at New York, in the county of New York and State of New York, have invented new and useful Improvements in Cooking and Washing Apparatus, of which the following is a specification.

This invention relates to cooking and washing apparatus, such as is intended particularly for treating straw which is to be utilized in the manufacture of paper-pulp, although the apparatus can be used for other purposes, if desired, in any process where the material is to be treated under pressure in a tightly-closed vessel, like that employed in my invention. A serious objection to apparatus of this character as generally constructed is that the cooking is of long duration through the fact that the steam fails to thoroughly penetrate the mass which is to be cooked. A further objection to old forms of apparatus is that after the cooking operation has been completed it is necessary to remove the cooked mass to a separate apparatus for the purpose of thoroughly washing the disintegrating liquors from the same. A third objection to old forms of apparatus is that great difficulty is experienced in removing or discharging the cooked mass from the cooking apparatus.

The first object of the present invention is to cause the steam or other fluid which is utilized in cooking the straw or other material to penetrate the entire mass, whereby the duration of the cooking operation is greatly decreased and the mass is cooked in a much more thorough and uniform manner than was formerly possible.

The second object of the present invention is to wash the cooked mass thoroughly and uniformly without the necessity of removing the same from the cooking apparatus, so that any further processes to which it may be necessary to subject the material can be completed in the same apparatus, whereby time which would be consumed in removing the mass to a separate apparatus is saved.

The third object of the invention is to improve the construction of the cooking-receptacle in such manner as greatly to facilitate the removal of the cooked material therefrom.

A further object of the invention is to support the cooking-receptacle in such manner that its size and capacity may be greatly increased without causing undue strain upon the supports thereof.

A further object of the invention is to avoid the use of interior mechanism in the cooking-receptacle which would retard the proper agitation and uniform cooking of the material under treatment.

In the present construction the receptacle is charged intermittently through an opening in the side and is emptied intermittently by removing its lower end, the cylinder being inclined to facilitate the withdrawal of the contents from such end, and the receptacle is made air-tight to admit the use of steam under pressure, so as to operate most effectively upon the contents, and the construction and operation of the receptacle are both of them therefore different from that of any open-ended cylinder employed for a continuous reception and discharge of the material in a continuous process.

With the foregoing and other objects in view, which will appear as the description proceeds, the invention resides in the novel combination and arrangement of parts and in the details of construction hereinafter described and claimed.

In the accompanying drawing, forming part of this specification, Figure 1 is a side elevation of a cooking and washing apparatus constructed in accordance with the invention. Fig. 2 is a vertical longitudinal section through the improved apparatus. Fig. 3 is an end elevation, partly in section. Fig. 4 is a similar elevation showing the opposite end of the apparatus. Fig. 5 is a detail section of one of the valves.

Like reference-numerals indicate corresponding parts in the different figures of the drawing.

The reference-numerals 1 indicate a plurality of uprights, each of which serves to uphold an inclined support, such as 2. Mounted upon the supports 2 is a plurality of brackets 3, in each of which is journaled a grooved roller 4. One set of rollers 4 is driven by a suitable series of sprocket-chains 5, which are engaged with sprocket-wheels 6 and are operated from any suitable source of power. (Not shown.)

The washing and cooking receptacle 7, which preferably is cylindrical in shape, is provided with a pair of annular collars 9 10, which surround the periphery of the receptacle. Each of the collars 9 10 is in engagement with one set of the supporting-rollers 4, the collars 9 and 10 each having a rib, such as 11, to fit into the grooved portions of the rollers. The receptacle is shown of air-tight construction, with all the joints of such a character as to retain steam when injected therein and to hold the material and any fluid without leakage.

Disposed around the periphery of the washing and cooking receptacle 7 on the outside thereof is a plurality of fluid-supply pipes 12, which extend longitudinally of the receptacle and pass through the collars 9 and 10. Leading from the supply-pipes 12 and extending into the receptacle 7 is a plurality of injectors 13, each of which is radially disposed with respect to the longitudinal center of the receptacle 7. A considerable number of the supply-pipes is employed, and by disposing them upon the exterior of the receptacle I avoid any obstruction to the free movement of the straw or other material during the rotation of the apparatus. Heretofore pipes have been disposed inside a rotary cooker; but I wholly disclaim such a construction.

Secured to the end 14 of the receptacle 7 at the central portion thereof is what I shall for convenience term a "distributing-chamber" 15, which is in communication with the supply-pipes 12 by means of a plurality of radially-disposed pipe-sections 16, each having therein a valve 17, which, as shown in Fig. 5, is provided with a handle 18 and is adapted to be held normally in closed position by means of a coil-spring 19, which is mounted in any suitable manner upon the valve. When it is desired to hold the valve in open position for the purpose hereinafter to be described, a hook 20 is engaged with an eye 21 upon the handle 18 to hold the same retracted against the tension of the coil-spring 19.

A trip member 22, which may be of any suitable form and construction, is arranged in the path of movement of the handles 18 of the valves 17 so that as the receptacle 7 rotates the handles 18 will strike successively against trip member 22 and cause the valves 17, which are at the lowest portion of the receptacle, to open, for which reason steam or water, as the case may be, will be fed through the injectors 13 at the lower portion of the receptacle. Extending through the removable packing-cap 24 of the distributing-chamber 15 is a stationary supply-pipe 25, into which leads a water-supply pipe 26, having a valve 27, and a steam-supply pipe 28, having a valve 29. The receptacle 7 is provided with one or more doors, such as 30, to permit the insertion of the material which is to be treated. Adjacent to its lower end the receptacle 7 is provided with a plurality of outlets 31, each having a controlling-valve 32. The lower end 33 of the receptacle 7 is removably secured in position by any suitable means—such, for example, as the devices 34. In order to facilitate the handling of the removable end 33 of the receptacle, said end is provided with a ring 35, adapted to receive the hook of a suitable block and tackle for suspending the end 33 after it has been removed from the receptacle.

Constructed as hereinbefore described the improved apparatus is used in the following manner when treating straw for the production of paper-pulp: The straw or other material of a similar nature is inserted into the receptacle 7 through the doors 30. The valve 27, controlling the water-supply, is closed, and the valve 29, controlling the steam-supply, is opened. The receptacle 7 is rotated by means of the sprocket-chains 5, which, as previously indicated, are to be connected with any suitable source of power. As the receptacle 7 rotates the valve-handles 18 successively come in contact with the trip member 22, whereby at least two of the lowest valves are always opened to permit the injection of steam into the receptacle 7 at the lowest portion thereof.

By reason of the fact that the steam is injected only at the lowest portion of the receptacle as it rotates said steam is caused to penetrate upward through the mass of material in the receptacle, whereby said material is uniformly and rapidly cooked. Furthermore, by reason of the fact that the valves 17 at the upper portion of the receptacle are closed all liability of wasting steam by injecting the same above the mass of material under treatment is effectually avoided. It will be understood that the steam which is fed into the receptacle quickly condenses, for which reason there is no necessity of providing an outlet therefor.

As soon as the material under treatment has been thoroughly and uniformly cooked in the manner described the steam-supply valve 29 is closed and the water-supply valve 27 is opened. Furthermore, all the handles 18 of the valves 17 are locked in open position against the tension of the springs 19 by means of the hooks 20 and all the valves 32 of the outlets 31 are opened. Water or other suitable fluid is thus permitted to enter the receptacle 7 through all of the injectors 13, so that the material under treatment is thoroughly and uniformly washed, it being understood that the washing operation is greatly facilitated and lessened in duration by the rotation of the receptacle and that the water is permitted to drain off through the outlets 31. As soon as the material under treatment has been properly washed the water-supply is cut off and the end 33 is removed. By reason of the fact that the receptacle 7 is mounted on an incline, as shown, the material under treatment is easily and quickly discharged, this operation, if necessary, being facilitated by the rotation of the receptacle 7.

It will be understood that when the material under treatment has been thoroughly cooked by the use of steam or other suitable fluid and after the same has been washed said material can be readily subjected in the manner described to any other processes, chemicals, or the like which may be necessary or desirable in order to improve its condition. By using the improved apparatus of this invention, therefore, the material under treatment can be subjected in the receptacle 7 to a number of processes 7, which have heretofore necessitated the removal of the material from one apparatus to another and sometimes through three or four sets of apparatus.

While the improved apparatus of this invention has been described as particularly intended for use in the production of paper-pulp, it will be understood that said apparatus may be readily put to other purposes if desired.

By mounting the receptacle upon an incline and providing the same with a removable lower end the material can be discharged much more quickly and effectively than is possible in apparatus where it is necessary to discharge the material through the same door by which it is introduced, as is common in air-tight rotary cookers.

By employing a plurality of injectors projecting into the receptacle the necessity of employing mechanism arranged interiorly of the receptacle for supplying steam is effectually avoided, and consequently any undesirable interference with the proper agitation and uniform cooking of the material is prevented.

The improved apparatus of this invention is strong, simple, durable, and inexpensive in construction, as well as thoroughly efficient in operation.

Changes in the precise embodiment of invention illustrated and described may be made within the scope of the following claims without departing from the spirit of the invention.

Having thus described the invention, what is claimed as new is—

1. An apparatus of the character described having an inclined support, a plurality of grooved rollers mounted on the support, means for rotating the rollers, an inclined receptacle having a removable lower end, a plurality of collars surrounding the receptacle and having ribs to receive the grooved rollers, a plurality of supply-pipes extending through the collars and arranged longitudinally on the outside of the receptacle, and one or more injectors leading from said supply-pipes into the receptacle.

2. An apparatus of the character described having an inclined support, a plurality of grooved rollers mounted on the support, means for rotating the rollers, an inclined receptacle having a removable lower end, a plurality of collars surrounding the receptacle and having ribs to receive the grooved rollers, a plurality of supply-pipes extending through the collars and arranged longitudinally on the outside of the receptacle, one or more injectors leading from said supply-pipes into the receptacle, and means for automatically opening said injectors at one point in the revolution of the receptacle and closing them during the remaining of the revolution.

3. An apparatus of the class described, comprising a rotary washing and cooking cylinder of air-tight character mounted upon an incline, collars and rollers supporting the receptacle as set forth, a plurality of pipes extended longitudinally upon the outside of the receptacle with injectors extending from the pipes within the receptacle, and means for automatically feeding fluid, at a given point in the rotation, to a portion of said injectors.

4. An apparatus of the class described, comprising a rotary washing and cooking cylinder of air-tight character mounted upon an incline, collars and rollers supporting the receptacle as set forth, a plurality of pipes extended longitudinally upon the outside of the receptacle with injectors extending from the pipes within the receptacle, and means for automatically opening a plurality of the injectors at the same point in the rotation of the receptacle, and simultaneously closing the remainder of the injectors.

5. An apparatus of the character described, comprising a rotary washing and cooking receptacle arranged on an incline, a door in the side of the receptacle for inserting a charge, and the lower end of said receptacle being removable to withdraw the charge, a plurality of pipes extended longitudinally upon the outside of the receptacle with injectors extending from the pipes within the receptacle, and means for opening said injectors when at the lower part of the receptacle and closing the remainder of the injectors.

6. An apparatus of the character described comprising a rotary receptacle, a plurality of supply-pipes extending longitudinally along the outside of the receptacle, a plurality of injectors leading from each of said supply-pipes into the receptacle, a valve for controlling each of the supply-pipes, and means for closing each of the valves during a portion of the revolution of the receptacle.

7. An apparatus of the character described comprising an inclined rotary receptacle, a plurality of supply-pipes extending longitudinally along the outside of said receptacle, a plurality of injectors leading from each of the supply-pipes into the receptacle, a valve in each of the supply-pipes and means for closing each of the valves during a portion of the revolution of the receptacle.

8. An apparatus of the character described comprising a peripherally-supported, inclined rotary receptacle, having a removable end, a plurality of supply-pipes extending longitudinally along the outside of the receptacle, a plurality of injectors leading from each of the supply-pipes into the receptacle, a valve in each of the supply-pipes, and means for closing each of the valves at one point in the revolution of the receptacle.

9. An apparatus of the character described comprising an inclined support, a plurality of grooved rollers on the support, means for rotating the rollers, an inclined receptacle having a removable lower end, a plurality of collars surrounding the receptacle and having ribs to engage the grooved rollers, a plurality of supply-pipes extending through the collars and arranged longitudinally on the outside of the receptacle, a plurality of injectors leading from each of the supply-pipes into the receptacle, a valve in each of the supply-pipes, a handle for each of the valves a coil-spring for holding each of the valves normally in closed position, a hook for locking each of the valves in open position, a distributing-chamber on the closed end of the receptacle at the central portion thereof, said distributing-chamber being in communication with the supply-pipe, a steam-supply pipe communicating with the distributing-chamber, a water-supply pipe communicating with the distributing-chamber, and a plurality of valved outlets for the receptacle.

In testimony whereof I have affixed my signature in presence of two witnesses.

JOHN B. CONGER.

Witnesses:
PETER A. LAURIN,
W. H. CLARKE.